(12) United States Patent
Schmidt et al.

(10) Patent No.: US 10,636,305 B1
(45) Date of Patent: Apr. 28, 2020

(54) SYSTEMS AND METHODS FOR DETERMINING PARKING AVAILABILITY ON FLOORS OF MULTI-STORY UNITS

(71) Applicant: Toyota Motor North America, Inc., Plano, TX (US)

(72) Inventors: Eric Randell Schmidt, Northville, MI (US); Kotaro Hashimoto, Frisco, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/193,119

(22) Filed: Nov. 16, 2018

(51) Int. Cl.
- *G08G 1/14* (2006.01)
- *H04W 4/44* (2018.01)
- *H04W 4/46* (2018.01)
- *G06K 9/00* (2006.01)

(52) U.S. Cl.
CPC ......... *G08G 1/143* (2013.01); *G06K 9/00812* (2013.01); *G08G 1/146* (2013.01); *H04W 4/44* (2018.02); *H04W 4/46* (2018.02)

(58) Field of Classification Search
CPC ......... G08G 1/143; G08G 1/146; H04W 4/46; H04W 4/44; G06K 9/00812
See application file for complete search history.

(56) References Cited

U.S. PATENT DOCUMENTS

| | | | |
|---|---|---|---|
| 5,432,508 A * | 7/1995 | Jackson | E04H 6/42 340/932.2 |
| 9,047,777 B2 | 6/2015 | Im et al. | |
| 9,747,797 B1 * | 8/2017 | Ghosh | G08G 1/144 |
| 9,881,220 B2 | 1/2018 | Koravadi | |
| 9,884,621 B2 | 2/2018 | Tarte et al. | |

(Continued)

FOREIGN PATENT DOCUMENTS

| | | |
|---|---|---|
| CN | 106448254 A | 2/2017 |
| DE | 102015218803 A1 | 3/2017 |
| KR | 20170070402 A | 6/2017 |

OTHER PUBLICATIONS

Drashti S Baldev & Pinaki A Ghosh, "Review of Parking Spaces Assistance Schemes in Vehicular Networks," International Journal of Advance Engineering and Research Development (IJAERD), Published 2015, URL: http://www.ijaerd.com/papers/special_papers/C1020309.pdf.

(Continued)

*Primary Examiner* — Quan-Zhen Wang
*Assistant Examiner* — Rajsheed O Black-Childress
(74) *Attorney, Agent, or Firm* — Dinsmore & Shohl LLP

(57) ABSTRACT

A vehicle includes one or more processors, one or more memory modules, and machine readable instructions stored in the one or more memory modules. The vehicle determines that the vehicle is in a multi-story unit, determines a first time when the vehicle enters a floor of the multi-story unit, determines a second time when the vehicle exits the floor of the multi-story unit, measures a staying time for the vehicle being on the floor of the multi-story unit based on the first time and the second time, determines whether the floor of the multi-story unit includes an available parking space based on the staying time, and transmits a notification to another vehicle in response to determination that the floor of the multi-story unit includes no available parking space.

22 Claims, 5 Drawing Sheets

(56) References Cited

U.S. PATENT DOCUMENTS

| | | |
|---|---|---|
| 9,984,572 B1 | 5/2018 | Newman |
| 2012/0200430 A1 | 8/2012 | Spahl |
| 2015/0033647 A1* | 2/2015 | Suhami .................... E04H 6/10 52/236.3 |
| 2015/0057926 A1* | 2/2015 | Gupta .................. G01C 21/165 701/500 |
| 2017/0025008 A1 | 1/2017 | Gignac et al. |
| 2017/0176601 A1* | 6/2017 | Nara ........................ G01C 5/06 |
| 2018/0043884 A1 | 2/2018 | Johnson |

OTHER PUBLICATIONS

Thierry Delot & Sergio Llarri, "The VESPA Project: Driving Advances in Data Management for Vehicular Networks," online article, Jul. 11, 2013, URL: https://ercim-news.ercim.eu/en94/special/the-vespa-project-driving-advances-in-data-management-for-vehicular-networks.

Walter Balzano & Fabio Vitale, "PAM-SAD: Ubiquitous Car Parking Availability Model Based on V2v and Smartphone Activity Detection," Journal: Springer, May 28, 2017, URL: https://link.springer.com/chapter/10.1007%2F978-3-319-59480-4_24.

* cited by examiner

US 10,636,305 B1

SYSTEMS AND METHODS FOR DETERMINING PARKING AVAILABILITY ON FLOORS OF MULTI-STORY UNITS

TECHNICAL FIELD

The present specification generally relates to systems and methods for determining parking availability on floors of multi-story units and, more specifically, to systems and methods for determining parking availability on floors of multi-story units based on traveling times of vehicles on the floors.

BACKGROUND

Parking availability information is beneficial to drivers who are looking for available parking spaces in a garage, or parking lot. Some garages or parking lots have sensors installed to monitor available parking spaces in the parking garages and parking lots, and to provide available parking space information to drivers by displaying the information at the entrance of the parking garages or the parking lots, or changing lights installed above the parking spaces, respectively. However, installation of the monitoring system is not only expensive but also time consuming. Accordingly, more efficient and less expensive way of monitoring parking spaces is needed.

SUMMARY

In one embodiment, a vehicle for transmitting information about parking space availability is provided. The vehicle includes one or more processors, one or more memory modules, and machine readable instructions stored in the one or more memory modules. The vehicle determines that the vehicle is in a multi-story unit, determines a first time when the vehicle enters a floor of the multi-story unit, determines a second time when the vehicle exits the floor of the multi-story unit, measures a staying time for the vehicle being on the floor of the multi-story unit based on the first time and the second time, determines whether the floor of the multi-story unit includes an available parking space based on the staying time, and transmits a notification to another vehicle in response to determination that the floor of the multi-story unit includes no available parking space.

In another embodiment, a method for transmitting information on availability of parking spaces in a multi-story unit is provided. The method includes determining a first time when a vehicle enters a floor of the multi-story unit, determining a second time when the vehicle exits the floor of the multi-story unit, measuring a staying time for the vehicle being on the floor of the multi-story unit based on the first time and the second time, determining whether the floor of the multi-story unit includes an available parking space based on the staying time, and transmitting a notification to another vehicle in response to determination that the floor of the multi-story unit includes no available parking space.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
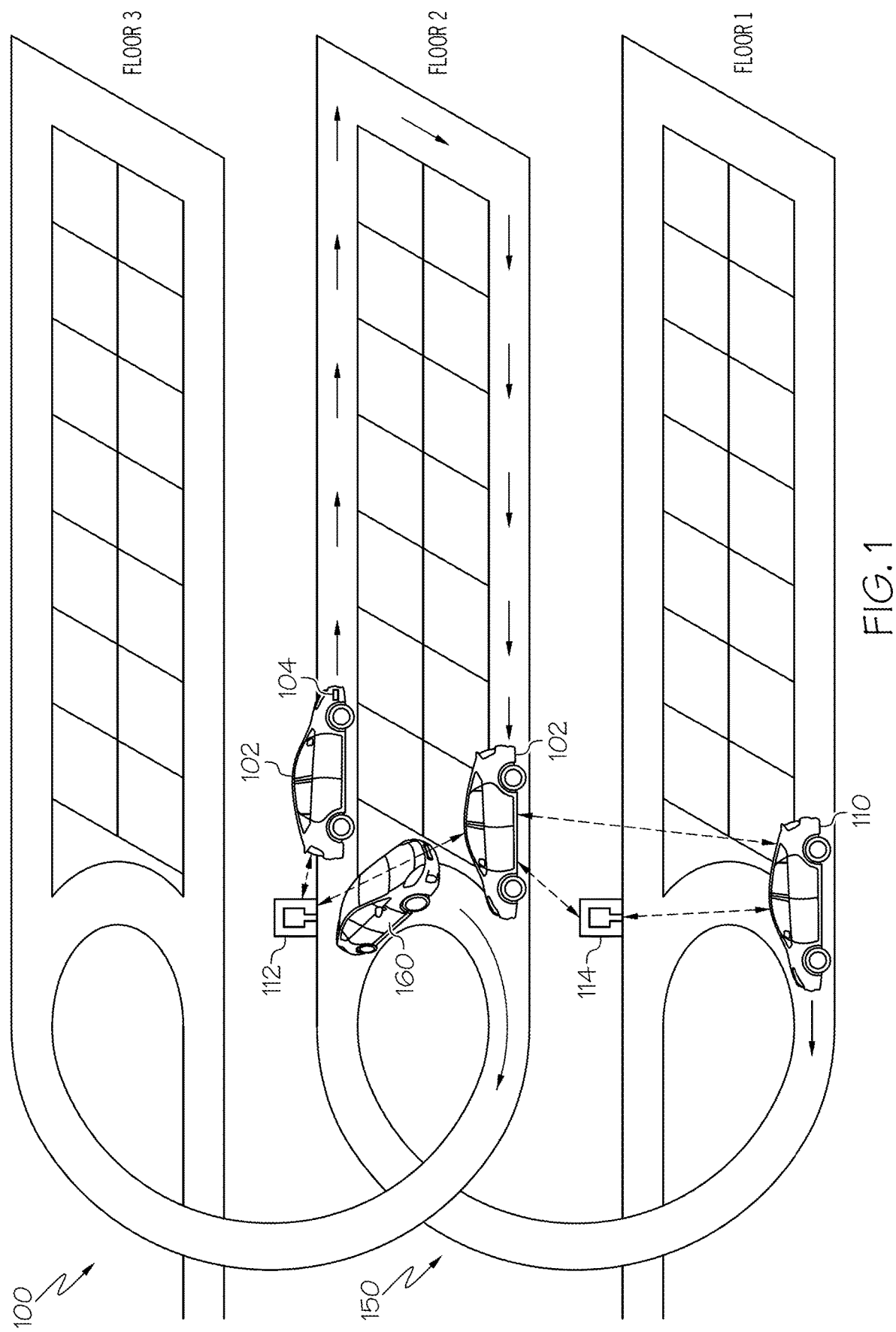
FIG. 1 depicts a system for determining an available parking space on a floor of a multi-story unit, according to one or more embodiments shown and described herein.

FIG. 1 generally depicts one embodiment of vehicles monitoring available parking spaces in a multi-story unit (e.g., a parking garage). A vehicle determines that the vehicle is in a multi-story unit, e.g., based on its location, determines a first time when the vehicle enters a floor of the multi-story unit, and determines a second time when the vehicle exits the floor of the multi-story unit. The vehicle measures a staying time on the floor of the multi-story unit based on the first time and the second time, and determines whether the floor of the multi-story unit includes an available parking space based on the staying time. If it is determined that the floor of the multi-story unit includes no available parking space, the vehicle transmits a notification to another vehicle (e.g., through a wireless communication). Based on the measured staying time on a floor of a multi-story unit, the vehicle may determine whether the floor has no vacancy and transmit the information about no vacancy to other vehicles. Various embodiments of the systems and methods for determining parking availability on floors of multi-story units based on traveling times of vehicles on the floors are described in greater detail herein.

Referring now to FIG. 1, a system 100 for determining an available parking space on a floor of a multi-story unit is depicted. In embodiments, one vehicle transmits information about available parking space on a floor of the multi-story unit (e.g., a parking garage, etc.) to another vehicle. FIG. 1 depicts a first vehicle 102, a second vehicle 110, and a third vehicle 160 on a multi-story unit 150. The first vehicle 102, the second vehicle 110, or the third vehicle 160 may be an automobile or any other passenger or non-passenger vehicle such as, for example, a terrestrial, aquatic, and/or airborne vehicle. In some embodiments, the first vehicle 102, the second vehicle 110, or the third vehicle 160 is an autonomous vehicle that navigates its environment with limited human input or without human input.

In FIG. 1, the first vehicle 102 is on the second floor of the multi-story unit 150, the second vehicle 110 is on the first floor of the multi-story unit 150, and the third vehicle 160 is on the second floor of the multi-story unit 150. In embodiments, the first vehicle 102 drives around on the second floor of the multi-story unit 150 in order to find a parking space. The second vehicle 110 enters the first floor and then goes up to the second floor of the multi-story unit 150 to find a parking space on the second floor. The third vehicle 160 bypasses the second floor and goes up to the third floor. For example, the third vehicle 160 bypasses the second floor because it has a reserved parking space on the third floor, or the driver of the third vehicle 160 prefers parking on the third floor.

In some embodiments, the first vehicle 102 may include imaging sensors 104 (e.g., camera, LIDAR, other sensors). For example, a camera or LIDAR may capture images of a vacant parking space and process the images to determine that a parking space is available. The vehicle may also determine the location of the available parking space, e.g., using GPS. The second vehicle 110 or the third vehicle 160 may include sensors similar to the imaging sensors 104. Each of the first vehicle 102, the second vehicle 110, and the third vehicle 160 may communicate the location of the available parking space to other vehicles or edge computing devices. Each of the first vehicle 102, the second vehicle 110, and the third vehicle 160 further includes network interface hardware 106 and an electronic control unit ("ECU") 108 (See FIG. 2). The imaging sensors 104, network interface hardware 106, and ECU 108 are described in greater detail herein with respect to FIG. 2.

The system 100 may also include a first edge computing device 112 that includes network interface hardware 116. The first edge computing device 112 may include a processor 140 (FIG. 2) and one or more memory modules 142 (FIG. 2) for storing processor-readable instructions as described in greater detail with respect to FIG. 2. In some embodiments, the first edge computing device 112 may be a roadside unit ("RSU"). In embodiments, the system 100 may include a second edge computing device 114. The first edge computing device 112 and the second edge computing device 114 may further include network interface hardware. In some embodiments, the second edge computing device 114 may be an RSU. The first edge computing device 112 and the second edge computing device 114 may maintain a data connection with one another via the network interface hardware 116 and may be a part of a larger network of computing devices (e.g., a grid computing network). In some embodiments, the first vehicle 102, the second vehicle 110 and the third vehicle 160 establish an edge server connection with one or more of the first edge computing device 112 and the second edge computing device 114 using the network interface hardware 106 of the first vehicle 102, the second vehicle 110, and the third vehicle 160 and the network interface hardware 116 of the first edge computing device 112 and the second edge computing device 114.

The first vehicle 102, the second vehicle 110, the third vehicle 160, the first edge computing device 112, and the second edge computing device 114 may form data connections with one another via their respective network interface hardware 106, 116. The first vehicle 102, the second vehicle 110, the third vehicle 160, the first edge computing device 112, and the second edge computing device 114 may transmit image data and other data over the data connections.

Figure 2:
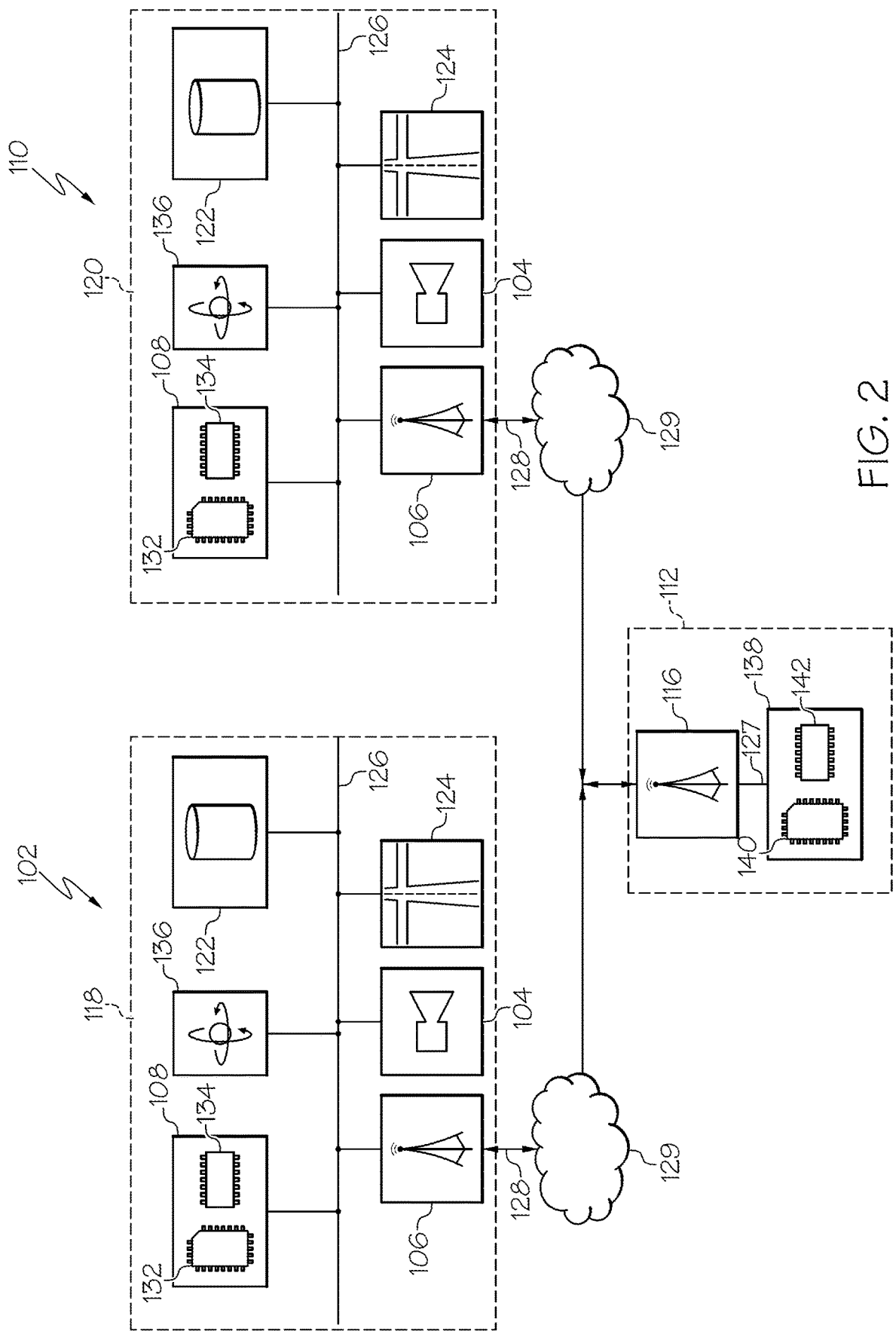
FIG. 2 depicts a schematic illustration of various components of a system for determining an available parking space on a floor of a multi-story unit, according to one or more embodiments shown and described herein.

Referring now to FIGS. 1 and 2, additional features and details of the system 100 are described. FIG. 2 is a schematic showing the various systems of each of the first vehicle 102 and the second vehicle 110 of FIG. 1. While the third vehicle 160 is not shown in FIG. 2, the third vehicle 160 may have similar elements as the first vehicle 102 and the second vehicle 110. It is to be understood that the first vehicle 102 and the second vehicle 110 are not limited to the systems and features shown in FIG. 2 and that each may include additional features and systems. As shown in FIG. 2, the first vehicle 102 includes a data unit 118 for generating, processing, and transmitting data. The second vehicle 110 may include a second data unit 120 which may be substantially similar to the data unit 118 of the first vehicle 102.

The data unit 118 may include the ECU 108, the network interface hardware 106, the imaging sensors 104, an ignition sensor 122, a navigation module 124, and one or more motion sensors 136 that may be connected by a communication path 126. The network interface hardware 106 may connect the first vehicle 102 to external systems via an external connection 128. For example, the network interface hardware 106 may connect the first vehicle 102 to one or more other vehicles directly (e.g., a direct connection to the second vehicle 110 such as V2V communication) or to an external network such as a cloud network 129.

Still referring to FIGS. 1 and 2, the ECU 108 may be any device or combination of components comprising a processor 132 and a non-transitory processor readable memory module 134. The processor 132 may be any device capable of executing a processor-readable instruction set stored in the non-transitory processor readable memory module 134. Accordingly, the processor 132 may be an electric controller, an integrated circuit, a microchip, a computer, or any other computing device. The processor 132 is communicatively coupled to the other components of the data unit 118 by the communication path 126. Accordingly, the communication path 126 may communicatively couple any number of processors 132 with one another, and allow the components coupled to the communication path 126 to operate in a distributed computing environment. Specifically, each of the components may operate as a node that may send and/or receive data. While the embodiment depicted in FIG. 2 includes a single processor 132, other embodiments may include more than one processor.

The non-transitory processor readable memory module 134 is coupled to the communication path 126 and communicatively coupled to the processor 132. The non-transitory processor readable memory module 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory processor readable memory module 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 134, other embodiments may include more than one memory module.

Still referring to FIGS. 1 and 2, one or more imaging sensors 104, such as one or more cameras, are coupled to the communication path 126 and communicatively coupled to the processor 132. While the particular embodiment depicted in FIGS. 1 and 2 shows an icon with one camera and reference is made herein to "camera" in the singular with respect to the data unit 118, it is to be understood that this is merely a representation and embodiments of the system may include one or more cameras having one or more of the specific characteristics described herein.

The imaging sensor 104 may be any device having an array of sensing devices capable of detecting radiation in an ultraviolet wavelength band, a visible light wavelength band, or an infrared wavelength band. The imaging sensor 104 may have any resolution. In some embodiments, one or more optical components, such as a mirror, fish-eye lens, or any other type of lens may be optically coupled to the imaging sensor 104. In embodiments described herein, the imaging sensor 104 may provide image data to the ECU 108 or another component communicatively coupled to the communication path 126. The image data may include image data of the environment around the first vehicle 102. For example, the image data includes pictures of parking spaces of the multi-story unit 150 along with vehicles on the parking spaces. In embodiments in which the first vehicle 102 is an autonomous or semi-autonomous vehicle, the imaging sensor 104 may also provide navigation support. That is, data captured by the imaging sensor 104 may be used by the navigation module 124 to autonomously or semi-autonomously navigate the first vehicle 102.

The imaging sensor 104 may operate in the visual and/or infrared spectrum to sense visual and/or infrared light. Additionally, while the particular embodiments described herein are described with respect hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image.

In operation, the imaging sensor 104 captures image data and communicates the image data to the ECU 108 and/or to other systems communicatively coupled to the communication path 126. The image data may be received by the processor 132, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The network interface hardware 106 may be coupled to the communication path 126 and communicatively coupled to the ECU 108. The network interface hardware 106 may be any device capable of transmitting and/or receiving data with external vehicles or servers directly or via a network, such as the cloud network 129. Accordingly, network interface hardware 106 can include a communication transceiver for sending and/or receiving any wired or wireless communication. For example, the network interface hardware 106 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 106 may include hardware configured to operate in accordance with the Bluetooth wireless communication protocol and may include a Bluetooth send/receive module for sending and receiving Bluetooth communications.

In some embodiments, the first vehicle 102 may be communicatively coupled to a network such as the cloud network 129. In embodiments, the cloud network 129 may include one or more computer networks (e.g., a personal area network, a local area network, grid computing network, wide area network, etc.), cellular networks, satellite networks and/or a global positioning system and combinations thereof. Accordingly, the first vehicle 102 can be communicatively coupled to the cloud network 129 via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Referring to FIGS. 1 and 2, in embodiments, the first vehicle 102 may connect with one or more external vehicles (e.g., the second vehicle 110) and/or external processing devices (e.g., the first edge computing device 112) via a direct connection. The direct connection may be a vehicle-to-vehicle connection ("V2V connection"). The V2V connection may be established using any suitable wireless communication protocols discussed above. A connection between vehicles may utilize sessions that are time and/or location-based. In embodiments, a connection between vehicles may utilize one or more networks to connect (e.g., the cloud network 129), which may be in lieu of, or in addition to, a direct connection (such as V2V) between the vehicles. By way of non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure (e.g., the first edge computing device 112). Still other examples include networks using centralized servers and other central computing devices to store and/or relay information between vehicles.

Referring to FIG. 2, the ignition sensor 122 may generate an ignition off signal based on an ignition status of the first vehicle 102. The ignition sensor 122 may transmit the ignition off signal to the ECU 108. The ECU 108 may receive the ignition off signal and cause the data unit 118 to transmit the status of the first vehicle to the first edge computing device 112 in response to receiving the ignition off signal. The first edge computing device 112 may determine that the first vehicle 102 is parked in response to receiving the ignition off signal from the first vehicle 102.

In embodiments, the data unit 118 may include one or more motion sensors 136 for detecting and measuring motion and changes in motion of the first vehicle 102. Each of the one or more motion sensors 136 is coupled to the communication path 126 and communicatively coupled to the one or more processors 132. The motion sensors 136 may include inertial measurement units. Each of the one or more motion sensors 136 may include one or more accelerometers and one or more gyroscopes. Each of the one or more motion sensors 136 transforms sensed physical movement of the first vehicle 102 into a signal indicative of an orientation, a rotation, a velocity, or an acceleration of the first vehicle 102.

In embodiments, the data unit 118 may include the navigation module 124. The navigation module 124 may be configured to obtain and update positional information of the first vehicle 102 and to display such information to one or more users of the first vehicle 102. The navigation module 124 may be able to obtain and update positional information based on geographical coordinates (e.g., latitudes and longitudes), or via electronic navigation where the navigation module 124 electronically receives positional information through satellites. In embodiments, the navigation module 124 may include a GPS system. The navigation module 124 may also include an altimeter to measure the altitude of the first vehicle 102. The components of the second data unit 120 of the second vehicle 110 are exactly the same as the components of the data unit 118 of the first vehicle 102 in the embodiment depicted in FIG. 2, though in some embodiments the components may differ.

Referring to FIGS. 1 and 2, the first edge computing device 112 may include the network interface hardware 116 which may be communicatively coupled to a control unit 138 including a processor 140 and a non-transitory processor readable memory module 142 via a communication path 127.

The network interface hardware 116 may be coupled to the communication path 127 and communicatively coupled to the control unit 138. The network interface hardware 116 may be any device capable of transmitting and/or receiving data with external vehicles or servers directly or via a network, such as the cloud network 129. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 116 may include hardware configured to operate in accordance with the Bluetooth wireless communication protocol and may include a Bluetooth send/receive module for sending and receiving Bluetooth communications.

The control unit 138 may include the processor 140 and the non-transitory processor readable memory module 142. The processor 140 may be any device capable of executing the processor-readable instruction set stored in the non-transitory processor readable memory module 142. Accordingly, the processor 140 may be an electric controller, an integrated circuit, a microchip, a computer, or any other computing device. The processor 140 is communicatively coupled to the communication path 127. Accordingly, the communication path 127 may communicatively couple any number of processors 140 with one another, and allow the components coupled to the communication path 127 to operate in a distributed computing environment. Specifically, each of the components may operate as a node that may send and/or receive data. While the embodiment depicted in FIG. 2 includes a single processor 140, other embodiments may include more than one processor.

The non-transitory processor readable memory module 142 is coupled to the communication path 127 and communicatively coupled to the processor 140. The non-transitory processor readable memory module 142 may comprise RAM, ROM, flash memories, hard drives, or any non-transitory memory device capable of storing machine-readable instructions such that the machine-readable instructions can be accessed and executed by the processor 140. The machine-readable instruction set may comprise logic or algorithm(s) written in any programming language of any generation (e.g., 1GL, 2GL, 3GL, 4GL, or 5GL) such as, for example, machine language that may be directly executed by the processor 140, or assembly language, object-oriented programming (OOP), scripting languages, microcode, etc., that may be compiled or assembled into machine readable instructions and stored in the non-transitory processor readable memory module 142. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 142, other embodiments may include more than one memory module.

Figure 3:
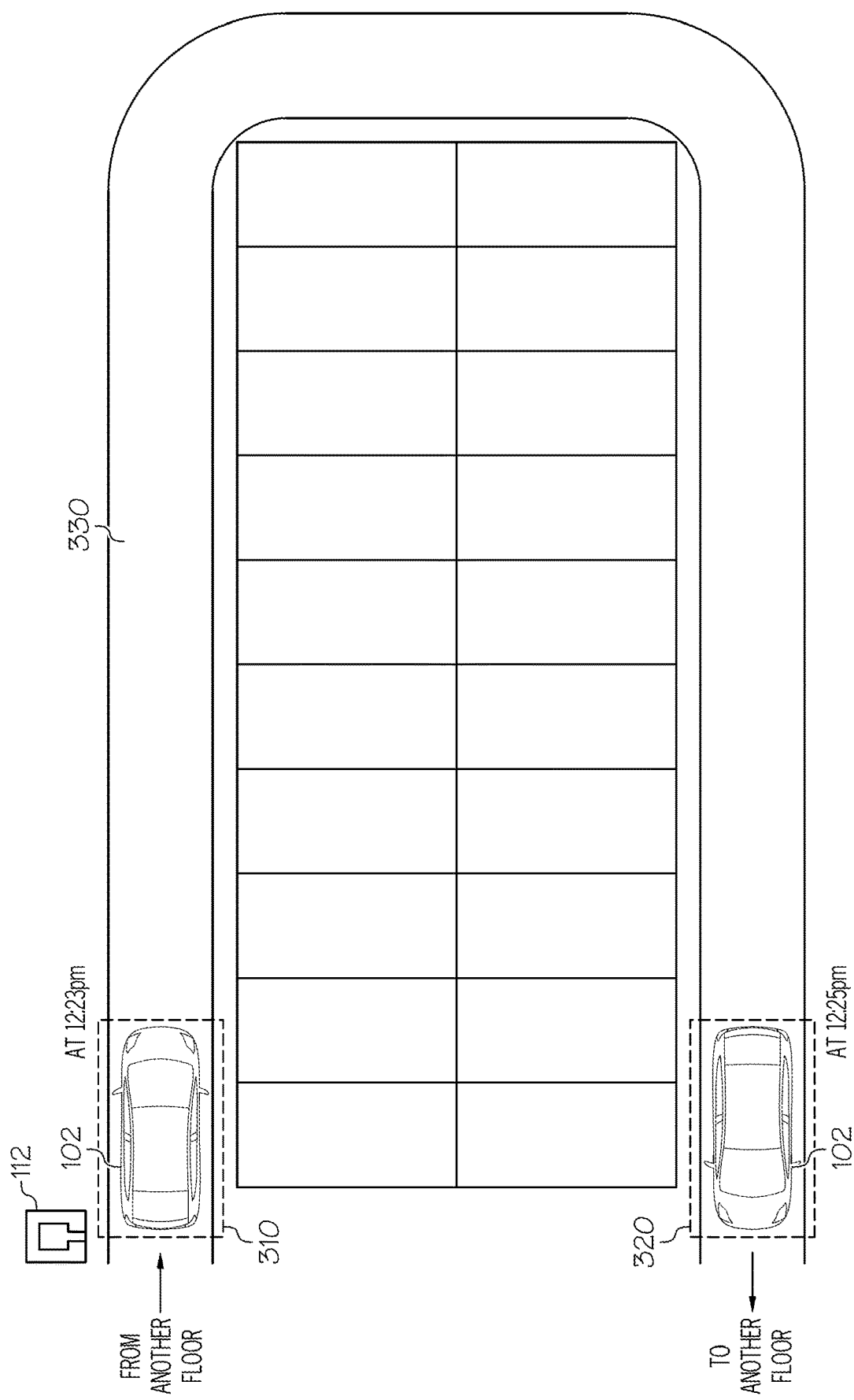
FIG. 3 depicts a vehicle driving on a floor of a multi-story unit, according to one or more embodiments shown and described herein.

FIG. 3 depicts a vehicle driving on a floor of a multi-story unit, according to one or more embodiments shown and described herein. In FIG. 3, the first vehicle 102 is on the second floor of the multi-story unit 150. In embodiments, the first vehicle 102 enters the second floor by passing an entering point 310. The entering point 310 may be a point which is located at the entrance of the second floor. In this embodiment, the first vehicle 102 moves upward from the first floor of the multi-story unit to the second floor, and enters the entering point 310. The first vehicle 102 may determine that it reached the entering point 310 using the navigation module 124. For example, the first vehicle 102 may receive information about the map of the second floor including the entering point 310 from the first edge computing device 112. The navigation module 124 may determine the current location of the first vehicle 102 on the map of the second floor and determine whether the current location matches with the entering point 310. In some embodiments, the first vehicle 102 may receive, from the first edge computing device 112, an indication that the first vehicle 102 entered the second floor of the multi-story unit 150. For example, when the first vehicle 102 is within a predetermined distance from the first edge computing device 112, the first edge computing device 112 transmits an indication that the first vehicle 102 entered the second floor of the multi-story unit 150.

The ECU 108 of the first vehicle 102 may determine the time when the first vehicle 102 enters the second floor of the multi-story unit 150. In embodiments, the ECU 108 of the first vehicle 102 may determine that the first vehicle 102 entered the second floor when the first vehicle 102 reached the entering point 310. The ECU 108 may determine that the first vehicle reached the entering point 310 of the second floor at 12:23 pm. In some embodiments, the ECU 108 of the first vehicle 102 may determine that the first vehicle 102 entered the second floor when the first vehicle receives, from the first edge computing device 112, the notification that first vehicle 102 entered the second floor of the multi-story unit 150.

The first vehicle 102 may move along a path 330 to find a parking spot on the second floor. If the first vehicle 102 does not find an available parking spot on the second floor, the first vehicle 102 ends up being at an exit point 320 of the second floor. The exit point may be a point which is located at the exit of the second floor. In this embodiment, the first vehicle 102 may pass the exit point 320 and move upward to the third floor. The first vehicle 102 may determine that it reached the exit point 320 using the navigation module 124. For example, the first vehicle 102 may receive information about the map of the second floor including the exit point 320 from the first edge computing device 112. The navigation module 124 may determine that the current location of the first vehicle 102 overlaps with the exit point 320 on the map of the second floor. The ECU 108 may determine the time when the first vehicle 102 reaches the exit point 320. For example, the ECU 108 may determine that the first vehicle reached the exit point 320 of the second floor at 12:25 pm.

Based on the time when the first vehicle 102 reached the entering point 310 and the time when the first vehicle reached the exit point 320, the ECU 108 may determine a staying time for which the first vehicle 102 stayed on the second floor. In this example, the first vehicle 102 stayed on the second floor for two minutes. The ECU 108 may transmit information about the staying time to the first edge computing device 112. Then, the ECU 108 may determine whether there is any available parking space on the second floor of the multi-story unit 150 based on the staying time. In embodiments, the ECU 108 may determine whether the staying time is less than a first threshold time. For example, the threshold time may be 10 minutes. If the ECU 108 determines that the staying time is less than the threshold time, the ECU 108 determines that there is no available parking space on the second floor. In this example, because the first vehicle stayed on the second floor for 2 minutes which is less than the threshold time of 10 minutes, the ECU 108 determines that there is no available parking space on the second floor. Then, the ECU 108 may communicate the information about the availability of the parking space on the second floor to the first edge computing device 112. The first edge computing device 112 may transmit the information about the availability of the parking space on the second floor to other edge computing device, e.g., the second edge computing device 114 in FIG. 1. The second edge computing device 114 may broadcast the information about the availability of the parking space on the second floor to vehicles on the first floor of the multi-story unit 150, e.g., the second vehicle 110.

In some embodiments, the first vehicle 102 may transmit the information about the availability of the parking space on the second floor to other vehicles through V2V communication. For example, the first vehicle 102 may transmit the information about the availability of the parking space on the second floor to the second vehicle 110 on the first floor.

A vehicle may withhold determining that there is no parking space on the second floor even if the staying time is less than the first threshold time. In some embodiments, the vehicle may withhold determining that there is no parking space on the second floor if the staying time is less than a second threshold time (e.g., 10 seconds) that is less than the first threshold time. For example, the third vehicle 160 in FIG. 1 bypasses the second floor of the multi-story unit 150 as described above. The staying time of the third vehicle 160 on the second floor may be 10 seconds. Because the staying time is less than the second threshold time (e.g., 30 seconds), the ECU of the third vehicle 160 may withhold determining that there is no available parking space on the second floor. In embodiments, if the staying time is less than the first threshold time but greater than the second threshold time, a vehicle may determine that there is no parking space on the second floor.

In some embodiments, a vehicle may withhold determining that there is no parking space on the second floor if a travel distance of the vehicle is less than a threshold distance. The threshold distance may be set, for example, as 90% of the total distance of the path 330 in FIG. 3. The vehicle may receive the threshold distance from the first edge computing device 112. For example, the travel distance of the third vehicle 160 in FIG. 1 on the second floor is about 5 meters and the threshold distance may be 90 meters. Because the travel distance of the third vehicle 160 is less than the threshold distance, the ECU of the third vehicle 160 may withhold determining that there is no available parking space on the second floor. In embodiments, if the drive distance is greater than the threshold distance and the staying time is less the first threshold time, a vehicle may determine that there is no parking space on the second floor.

Figure 4:
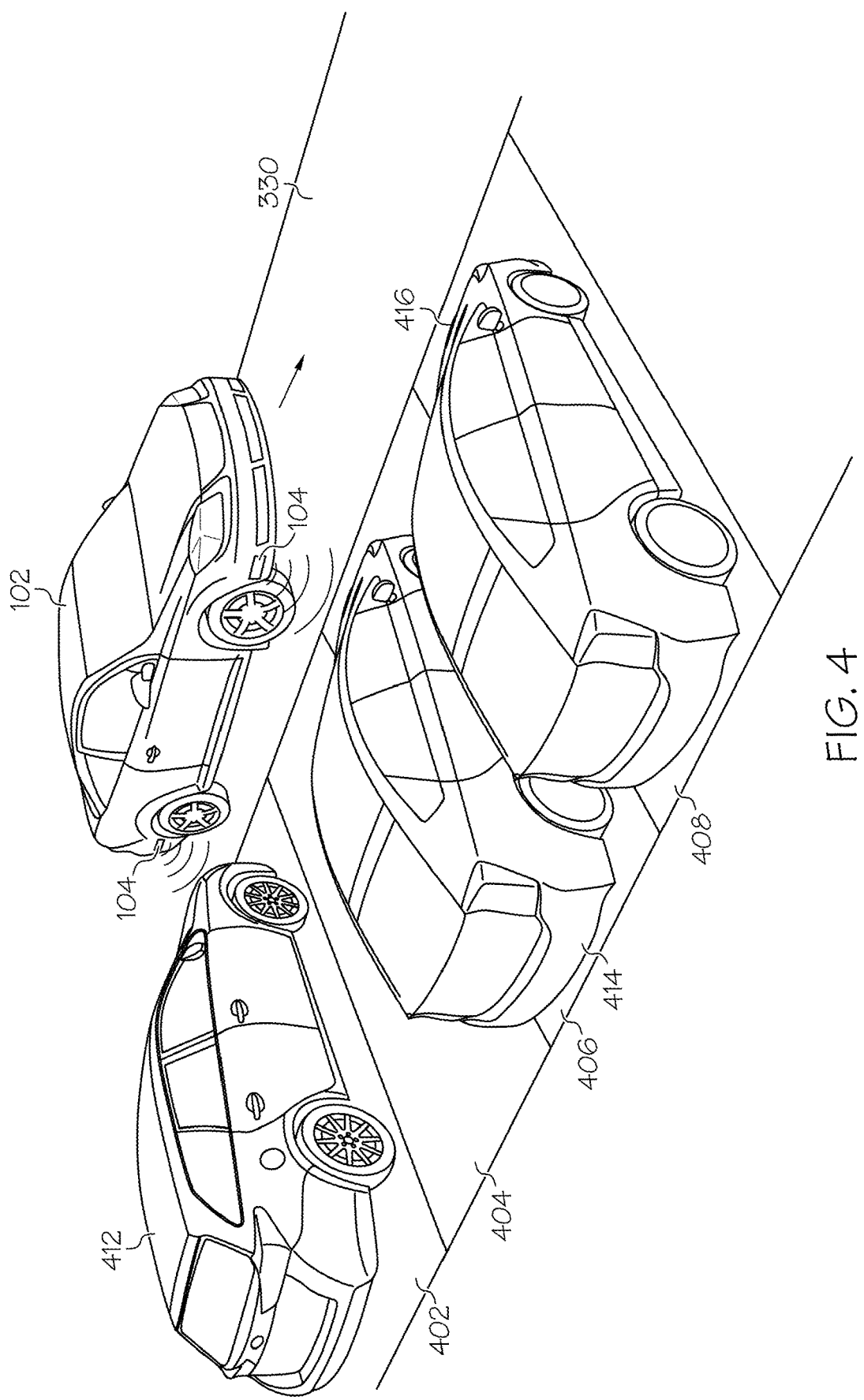
FIG. 4 depicts a vehicle driving on a floor of the multi-story unit and monitoring an available parking space, according to one or more embodiments shown and described herein.

FIG. 4 depicts the first vehicle 102 driving on a floor of the multi-story unit 150, according to one or more embodiments shown and described herein. In embodiments, the first vehicle 102 may include multiple imaging sensors 104. The imaging sensors 104 may be positioned on the side of the first vehicle 102 such that the imaging sensors 104 may capture images of parking spaces as the first vehicle 102 drives around in the multi-story unit 150. For example, the imaging sensors 104 may capture images of the parking spots 402, 404, 406, and 408 as shown in FIG. 4. The parking spots 402, 406, and 408 are occupied by vehicles 412, 414, and 416, respectively. The ECU 108 of the first vehicle may process images from the imaging sensor 104 and determine the parking spot 404 is not occupied by a vehicle. The first vehicle 102 may not park on the parking spot 404 even if no vehicle occupies the parking spot 404 because the space on the parking spot 404 may be too tight for the first vehicle 102 to fit in. For example, the vehicle 412 parked very close to the borderline between the parking spot 402 and the parking spot 404. Then, the first vehicle 102 may continue to follow the path 330 and reach the exit point 320 as shown in FIG. 3.

As discussed above with reference to FIG. 3, the ECU 108 of the first vehicle 102 may determine the staying time during which the first vehicle 102 stayed on the second floor based on the time when the first vehicle 102 reached the entering point 310 and the time when the first vehicle reached the exit point 320. If the staying time is less than the threshold time, and the ECU 108 determines that there is no parking space unoccupied by a vehicle, the ECU 108 determines that there is no available parking space on the second floor of the multi-story unit 150. Then, the ECU 108 may transmit information that there is no available parking space on the second floor of the multi-story unit 150 to the first edge computing device 112 and/or other vehicles.

If the duration is less than the threshold time but the ECU determines that there is at least one parking space unoccupied by a vehicle, the ECU 108 may determine that there is a parking space for a vehicle that is smaller than the first vehicle 102. The ECU 108 then transmits information that there is a parking space for a vehicle that is smaller than the first vehicle 102 to the first edge computing device 112 and/or other vehicles. For example, if the first vehicle 102 is a full-size SUV, then the first vehicle 102 may transmit information that there is a parking space for a vehicle that is smaller than a full-size SUV to the first edge computing device 112 and/or other vehicles. The second vehicle 110, which may be an intermediate size SUV, on the first floor of the multi-story unit 150 may receive the information directly from the first vehicle 102 or from the second edge computing device 114 that receives the information from the first edge computing device 112. The second vehicle 110 may enter the second floor of the multi-story unit 150 and move along the path 330. The imaging sensors of the second vehicle 110 may capture images of the parking spots 402, 404, 406, and 408 as shown in FIG. 4. The parking spots 402, 406, and 408 are occupied by vehicles 412, 414, and 416, respectively. The ECU 108 of the second vehicle 110 may process images from the imaging sensor 104 and determine the parking spot 404 is not occupied by a vehicle. If the second vehicle 110 reaches the exit point 320 in less than the threshold time, e.g., reaches the exit point 320 in 1 minute, but the ECU 108 of the second vehicle 110 determines that there is at least one parking space unoccupied by a vehicle, the ECU 108 of the second vehicle 110 determines that there is a parking space for a vehicle that is smaller than the second vehicle 110. For example, the second vehicle 110 may transmit information that there is a parking space for a vehicle that is smaller than an intermediate-size SUV to the first edge computing device 112 and/or other vehicles.

Figure 5:
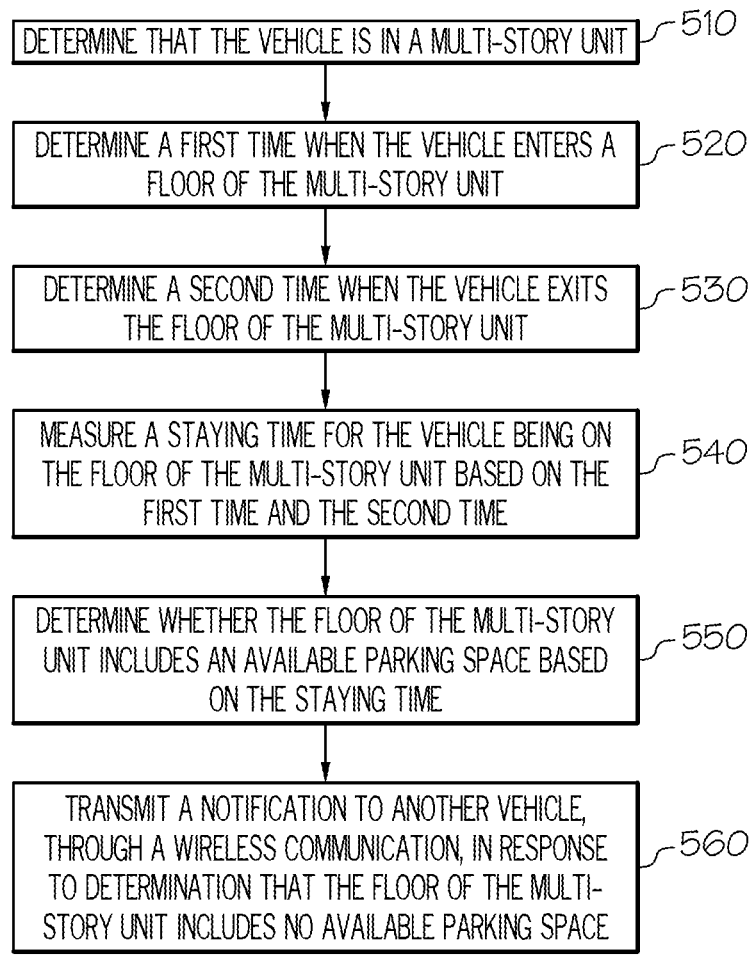
FIG. 5 depicts a flowchart for transmitting information about parking availability among vehicles on a multi-story unit, according to one or more embodiments shown and described herein.

FIG. 5 depicts a flowchart for transmitting information about parking availability among vehicles on a multi-story unit, according to one or more embodiments shown and described herein.

In step 510, an ECU of a vehicle determines that the vehicle is in a multi-story unit. In embodiments, the ECU of the first vehicle 102 may determine whether the first vehicle 102 is in a multi-story unit based on the current location of the first vehicle 102 using the navigation module 124. For example, if the navigation module 124 indicates that the current location of the vehicle corresponds to the location of a multi-story unit, e.g., a parking garage, the first vehicle 102 determines that the first vehicle 102 is in a multi-story unit.

In step 520, the ECU of the vehicle determines a first time when the vehicle enters a floor of the multi-story unit. In embodiments, the ECU 108 of the first vehicle 102 may determine that the first vehicle 102 enters the floor of the multi-story unit 150 based on information received from the first edge computing device 112 on the floor of the multi-story unit. The first vehicle 102 may determine that the first vehicle 102 enters the second floor of the multi-story unit 150 when the first vehicle 102 reaches the entering point 310 shown in FIG. 3. For example, the ECU 108 may determine that the first vehicle 102 reached the entering point 310 of the second floor at 12:23 pm.

In step 530, the ECU of the vehicle determines a second time when the vehicle exits a floor of the multi-story unit. In embodiments, the ECU 108 of the first vehicle 102 may determine that the vehicle exits the floor of the multi-story unit when the first vehicle 102 reaches the exit point 320. For example, the ECU 108 may determine that the first vehicle 102 reached the exit point 320 of the second floor at 12:25 pm.

In step 540, the ECU of the vehicle measures a staying time for the vehicle being on a floor of the multi-story unit. In embodiments, based on the time when the first vehicle 102 reached the entering point 310 and the time when the first vehicle reached the exit point 320, the ECU 108 may determine the duration during which the first vehicle 102 stayed on the second floor. In this example, the first vehicle 102 stayed on the second floor for two minutes.

In step 550, the ECU of the vehicle determines whether the floor of the multi-story unit includes an available parking space based on the time. In embodiments, the ECU 108 may determine whether the duration is less than a first threshold time. If the ECU 108 determines that the duration is less than the threshold time, the ECU 108 determines that there is no available parking space on the second floor.

The first threshold time may be a fixed amount, for example, 10 minutes. In some embodiments, the first threshold time may be dynamically updated based on the actual staying time of vehicles parked on the floor. The first edge computing device 112 may store the first threshold time and transmit it to vehicles coming into the second floor of the multi-story unit 150. The first threshold time may be updated to a minimum staying time among the actual staying times of vehicles parked on the floor. For example, the current first threshold time may be 12 minutes. The first edge computing device 112 may collect staying times of the vehicles that parked on the second floor for a past certain period of time (e.g., past 24 hours) and determine that the minimum staying time is 9 minutes. Then, the first edge computing device 112 updates the first threshold time to 9 minutes.

In some embodiments, the ECU 108 determines whether the staying time is less than a second threshold time that is less than the first threshold time. For example, the second threshold time may be 30 seconds. If the staying time is less than the second threshold time, the ECU 108 may withhold determining that there is no available parking space on the second floor. For example, the third vehicle 160 in FIG. 1 bypasses the second floor of the multi-story unit 150 as described above. The staying time of the third vehicle 160 on the second floor may be 10 seconds. Because the staying time is less than the second threshold time (e.g., 30 seconds), the ECU of the third vehicle 160 may withhold determining that there is no available parking space on the second floor.

In step 560, the ECU of the vehicle transmits a notification to another vehicle, through a wireless communication, related to availability of the floor. In embodiments, the ECU of the vehicle may transmit a notification that there is no available parking space on the second floor of the multi-story unit 150 to the first edge computing device 112 through V2X communication. The first edge computing device 112 may relay the notification to the second edge computing device 114 which then transmits the notification to the vehicles on the first floor of the multi-story unit 150. In some embodiments, the first vehicle 102 may transmit a notification that there is no available parking space on the second floor of the multi-story unit 150 to vehicles on the first floor through V2V communication. In some embodiments, the first vehicle 102 may broadcast a notification that there is no available parking space on the second floor of the multi-story unit 150 to the vehicles in the multi-story unit 150 and/or the vehicles proximate to the multi-story unit 150.

It should now be understood that a vehicle determines a staying time on a floor of a multi-story unit. Based on the staying time, the vehicle determines whether the floor includes an available parking space without obtaining additional information for example, image data. If the vehicle determines that there is no available parking space on the floor, the vehicle transmits that information to other vehicles. Accordingly, vehicles may determine that the parking spaces on the floor are fully occupied and broadcast information about the parking spaces on the floor even without sensors (e.g., imaging sensors) for monitoring parking spaces.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claims is:

1. A vehicle comprising:
one or more processors;
one or more memory modules; and
machine readable instructions stored in the one or more memory modules that cause the vehicle to perform at least the following when executed by the one or more processors:
determine a first time when the vehicle enters a floor of a multi-story unit;
determine a second time when the vehicle exits the floor of the multi-story unit;
measure a staying time for the vehicle being on the floor of the multi-story unit based on the first time and the second time;
determine whether the floor of the multi-story unit includes an available parking space based on the staying time; and
transmit a notification to another vehicle in response to determination that the floor of the multi-story unit includes no available parking space.

2. The vehicle of claim 1, wherein the machine readable instructions stored in the one or more memory modules, when executed by the one or more processors, cause the vehicle to:
determine whether the staying time is less than a first threshold time; and
determine that the floor of the multi-story unit includes no available parking space in response to the staying time being less than the first threshold time.

3. The vehicle of claim 2, wherein the machine readable instructions stored in the one or more memory modules, when executed by the one or more processors, cause the vehicle to:
receive the first threshold time from an edge computing device of the multi-story unit through V2X communication.

4. The vehicle of claim 1, wherein the machine readable instructions stored in the one or more memory modules, when executed by the one or more processors, cause the vehicle to:
determine whether the staying time is less than a first threshold time;
determine whether the staying time is less than a second threshold time, the second threshold time being less than the first threshold time; and
determining that the floor of the multi-story unit includes no available parking space in response to determination that the staying time is less than the first threshold time and greater than the second threshold time.

5. The vehicle of claim 1, wherein the machine readable instructions stored in the one or more memory modules, when executed by the one or more processors, cause the vehicle to:
transmit the staying time to an edge computing device of the multi-story unit.

6. The vehicle of claim 1, further comprising a navigation module for determining a location of the vehicle,
wherein the machine readable instructions stored in the one or more memory modules, when executed by the one or more processors, cause the vehicle to:
receive a map of the floor of the multi-story unit from an edge computing device of the multi-story unit;
determine the first time when the vehicle enters the floor of the multi-story unit based on a first current location of the vehicle on the map of the floor; and
determine the second time when the vehicle exits the floor of the multi-story unit based on a second current location of the vehicle on the map of the floor.

7. The vehicle of claim 1, further comprising an altimeter, wherein the machine readable instructions stored in the one or more memory modules, when executed by the one or more processors, cause the vehicle to:
determine that the vehicle is on the floor of the multi-story unit based on a signal from the altimeter.

8. The vehicle of claim 1, wherein the machine readable instructions stored in the one or more memory modules, when executed by the one or more processors, cause the vehicle to:
determine whether a travel distance of the vehicle on the floor of the multi-story unit is greater than a threshold distance;
determine whether the staying time is less than a first threshold time; and
determine that the floor of the multi-story unit includes no available parking space in response to the staying time being less than the first threshold time and determination that the travel distance of the vehicle on the floor of the multi-story unit is greater than the threshold distance.

9. The vehicle of claim 8, wherein the machine readable instructions stored in the one or more memory modules, when executed by the one or more processors, cause the vehicle to:
receive the threshold distance from an edge computing device of the multi-story unit.

10. The vehicle of claim 1, further comprising one or more imaging sensors for capturing images of parking spaces,
wherein the machine readable instructions stored in the one or more memory modules, when executed by the one or more processors, cause the vehicle to:
determine whether any of the parking spaces on the floor of the multi-story unit is unoccupied by a vehicle by processing the images;
determine whether the staying time is less than a first threshold time; and
determine that the floor of the multi-story unit includes no available parking space in response to the staying time being less than the first threshold time and determination that all of the parking spaces on the floor of the multi-story unit are occupied by vehicles.

11. The vehicle of claim 1, further comprising one or more imaging sensors for capturing images of parking spaces,
  wherein the machine readable instructions stored in the one or more memory modules, when executed by the one or more processors, cause the vehicle to:
  determine whether any of the parking spaces on the floor of the multi-story unit is unoccupied by a vehicle by processing the images;
  determine whether the staying time is less than a first threshold time; and
  determine that the floor of the multi-story unit includes an available parking space for another vehicle smaller than the vehicle in response to the staying time being less than the first threshold time and determination that one of the parking spaces on the floor of the multi-story unit is unoccupied by a vehicle.

12. The vehicle of claim 1, wherein the machine readable instructions stored in the one or more memory modules, when executed by the one or more processors, cause the vehicle to:
  determine that the vehicle is in a multi-story unit based on a location of the vehicle.

13. A method for transmitting information on availability of parking spaces in a multi-story unit, the method comprising:
  determining a first time when a vehicle enters a floor of the multi-story unit;
  determining a second time when the vehicle exits the floor of the multi-story unit;
  measuring a staying time for the vehicle being on the floor of the multi-story unit based on the first time and the second time;
  determining whether the floor of the multi-story unit includes an available parking space based on the staying time; and
  transmitting a notification to another vehicle in response to determination that the floor of the multi-story unit includes no available parking space.

14. The method of claim 13, further comprising:
  determining whether the staying time is less than a first threshold time; and
  determining that the floor of the multi-story unit includes no available parking space in response to the staying time being less than the first threshold time.

15. The method of claim 14, further comprising:
  receiving the first threshold time from an edge computing device of the multi-story unit.

16. The method of claim 13, further comprising:
  determining whether the staying time is less than a first threshold time;
  determining whether the staying time is greater than a second threshold time, the second threshold time being less than the first threshold time; and
  determining that the floor of the multi-story unit includes no available parking space in response to determination that the staying time is less than the first threshold time and greater than the second threshold time.

17. The method of claim 13, further comprising:
  receiving a map of the floor of the multi-story unit from an edge computing device of the multi-story unit;
  determining the first time when the vehicle enters the floor of the multi-story unit based on a current location of the vehicle on the map of the floor; and
  determining the second time when the vehicle exits the floor of the multi-story unit based on a current location of the vehicle on the map of the floor.

18. The method of claim 13, further comprising:
  determining whether a travel distance of the vehicle on the floor of the multi-story unit is greater than a threshold distance;
  determining whether the staying time is less than a first threshold time; and
  determining that the floor of the multi-story unit includes no available parking space in response to the staying time being less than the first threshold time and in response to determination that the travel distance of the vehicle on the floor of the multi-story unit is greater than the threshold distance.

19. The method of claim 18, further comprising:
  receiving the threshold distance from an edge computing device of the multi-story unit.

20. The method of claim 13, further comprising:
  determining whether any of the parking spaces on the floor of the multi-story unit is unoccupied by a vehicle by processing images captured by one or more imaging sensors;
  determining whether the staying time is less than a first threshold time; and
  determining that the floor of the multi-story unit includes no available parking space in response to the staying time being less than the first threshold time and determination that all of the parking spaces on the floor of the multi-story unit are occupied by vehicles.

21. The method of claim 13, further comprising:
  determining whether any of the parking spaces on the floor of the multi-story unit is unoccupied by a vehicle by processing the images captured by one or more imaging sensors;
  determining whether the staying time is less than a first threshold time; and
  determining that the floor of the multi-story unit includes an available parking space for another vehicle smaller than the vehicle in response to the staying time being less than the first threshold time and determination that one of the parking spaces on the floor of the multi-story unit is unoccupied by a vehicle.

22. The method of claim 13, further comprising:
  determining that the vehicle is in a multi-story unit based on a location of the vehicle.

* * * * *